United States Patent [19]
Elion et al.

[11] 3,862,061
[45] Jan. 21, 1975

[54] IMIDAZOLE DERIVATIVES

[75] Inventors: Gertrude B. Elion, Chapel Hill;
Paulo M. S. DeMiranda, Raleigh;
Lowrie M. Beacham, III, Durham,
all of N.C.

[73] Assignee: Burroughs Wellcome Co., Triangle Park, N.C.

[22] Filed: Mar. 23, 1973

[21] Appl. No.: 344,270

[30] Foreign Application Priority Data
Mar. 24, 1972 Great Britain.................. 13901/72

[52] U.S. Cl.............................. 260/112.5, 260/309
[51] Int. Cl............................................. C07d 49/36
[58] Field of Search......................... 260/309, 112.5

[56] References Cited
OTHER PUBLICATIONS

Chalmers, et al., Aust. J. Exp. Biol. Med. Sci., (1967), 45, 681–691.
Elion, Immunophathology Vth Intrnl. Symposium, "Mechanisms of Inflammation Induced by Immune Reactions," June 1967, pp. 399–401.

*Primary Examiner*—Henry R. Jiles
*Assistant Examiner*—C. M. S. Jaisle
*Attorney, Agent, or Firm*—Dike, Bronstein, Roberts, Cushman & Pfund

[57] ABSTRACT

Compounds of formula (I) or a pharmaceutically acceptable salt thereof,

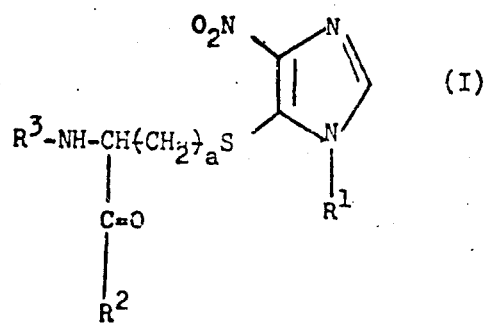

wherein $R^1$ is a hydrogen atom, a lower alkyl group or a benzyl group; $R^2$ is a group $OR^5$, $NR^5$ or an amide linked amino acid residue, in which $R^5$ is a hydrogen atom or a lower alkyl group optionally substituted with one or more amino and/or carboxylic groups; $R^3$ is a hydrogen atom, a group

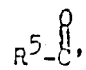

an amide linked amino acid residue or a group

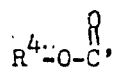

in which $R^4$ is a t-butyl group, a benzyl group or a group $CH_2$=CH; and $a$=1 or 2.

The compounds are useful as suppressors of the immune response.

21 Claims, No Drawings

IMIDAZOLE DERIVATIVES

This invention relates to imidazole derivatives which are useful as suppressors of the immune response, and to methods of preparation thereof.

According to the present invention there is provided a compound of formula (I) or a pharmaceutically acceptable salt thereof,

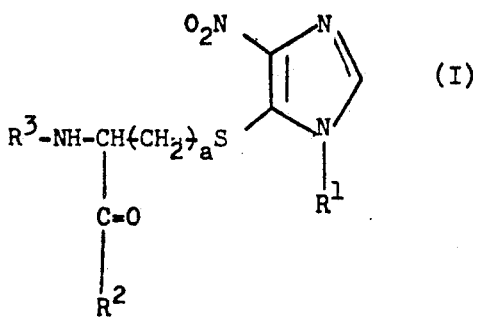

wherein $R^1$ is a hydrogen atom, a lower alkyl group or a benzyl group; $R^2$ is a group $OR^5$ or an amide linked amino acid residue, in which $R^5$ is a hydrogen atom or a lower alkyl group optionally substituted with one or more amino and/or carboxylic groups; $R^3$ is a hydrogen atom, a group

an amide linked amino acid residue or a group

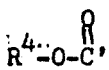

in which $R^4$ is a t-butyl group, a benzyl group or a group $CH_2=CH$; and $a=1$ or 2.

As used herein and throughout the specification the term "lower alkyl group" defines an alkyl group having 1 to 6 carbon atoms, preferabky 1 to 4 carbon atoms. In the above formula the amino acid residue of $R^2$ is preferably $-NH(-CH_2)_m CO_2H$ wherein $m=1$ or 2, such as glycine, and the amino acid residue of $R^3$ is preferably

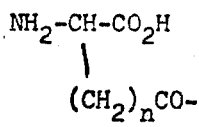

wherein $n=1$ or 2, such as glutamic acid.

Salts which are especially convenient for therapeutic use are salts of pharmaceutically acceptable carboxylic acids such as lactic, acetic or malic acid as well as salts of pharmaeutically acceptable mineral acids such ashydrochloric acid or sulphuric acid. The activity of any salt administered resides in the base. In addition to the above, toxic salts can also be made and converted into either the base or the pharmaceutically acceptable salts by standard methods, e.g., by metathetical reaction.

The compounds of formula (I) and their pharmaceutically acceptable salts, hereinafter referred to as their 'salts,' are particularly useful in suppressing the immune response of an animal or mammal to the transplantation of foreign cells into the body of the animal, e.g., in organ transplants such as kidney, etc., transplants. The compounds and their salts are also useful in the treatment of mammalian auto-immune diseases such as lupus erythematosus, haemolytic anaemia, ulcerative colitis and nephrosis.

The compounds of formula (I) and their salts are useful as immunosuppressants at a dosage of 1 to 10 mg/kg of animal or mammal body weight per day. They are preferably administered internally in a unit dosage of about 10 to 250 mg per unit dose, for example orally as a tablet comprising a pharmaceutically acceptable carrier and the active compound or a salt thereof. The same dosage and unit dosage is used for suppressing the immune response as well as treating auto-immune diseases. They may also be administered orally as a liquid or a suspension or may be administered parenterally in a sterile fluid by injection or intravenous drip. The pharmaceutical compositions may be made by any convenient method comprising the admixture of the components.

For oral administration fine powders or granules may contain diluting, dispersing and/or surface-active agents and may be presented in a draught, in water or in a syrup; in capsules or cachets in the dry state; in a non-aqueous suspension, wherein suspending agents may be included; in tablets preferably made from granules of the active ingredient with a diluent by compression with binders and lubricants, or in a suspension in water or in a syrup, or an oil, or in a water/oil emulsion, when flavoring, preserving, suspending, thickening and emulsifying agents may also be included. However the formulation is advantageously presented in discrete units such as tablets, capsules or cachets, each containing a predetermined amount of the compound. The granules or the tablets may be coated and the tablets may be scored.

For parenteral administration, the compounds may be presented in sealed unit dose or multi-dose containers, in aqueous or non-aqueous injection solutions which may contain antioxidants, buffers, bacteriostats and solutes which render the compounds isotonic with the blood, or in aqueous or non-aqueous suspension when suspending agents and thickening agents may also be included. Extemporaneous injection solutions and suspensions may be made from sterile powders, granules, or tablets which may contain diluents, dispersing and/or surface-active agents, binders and lubricants.

In another aspect there is provided a pharmaceutical composition comprising a compound of formula (I) or a pharmaceutically acceptable salt thereof in association with a pharmaceutically acceptable carrier therefor or in an effective unit dosage form. In a further aspect there is provided a method of making the pharmaceutical composition by admixture of a compound of formula (I) or its salt with a carrier by known techniques.

The compounds of formula (I) may be conveniently prepared by condensing a cysteinyl derivative of formula (II) with a nitroimidazole of formula (III) wherein $R^1$, $R^2$, and $R^3$ are as hereinbefore defined, except that when $R^2$ is a hydroxyl group, $R^3$ may not be a hydrogen atom, and X is a leaving group, such as a halogen atom, an alkylthio, or a p-toluenesulphonyl group.

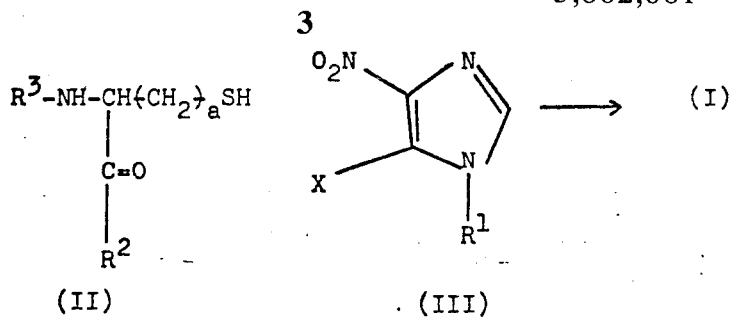

(II)     (III)

The reaction may be advantageously carried out at room temperature in a polar solvent in the presence of a buffering agent such as sodium acetate. Although higer reaction temperatures may be used, it is desired that the reaction temperature should not exceed 30°C and most preferably be maintained at about room temperature. Higher reaction temperatures may be used with some reactants; however, others may decompose at elevated temperatures.

The solvent employed is generally a polar solvent which will dissolve both the amino acid or peptide reactant of formula (II) and the imidazole reactant of formula (III), and may be protic or aprotic, for example it may be water, acetone or dimethylsulphoxide. A buffering agent, such as sodium acetate, sodium carbonate or potassium carbonate, is used to combine with acidic bi-products formed during the course of the reaction and to maintain a favourable pH in the range of about 5 to 11. Tertiary amines such as triethylamine may also be used.

This method is preferably used for the preparation of those compounds of formula (I) wherein $R^2$ is a hydroxyl group and $R^3$ is a t-butyloxycarbonyl group, an acetyl group, a carbobenzoxy group, or a N-t-butyloxycarbonyl glycyl group or wherein $R^2$ is the group $-NHCH_2CO_2H$ and $R^3$ is the group $-CO(CH_2)_2CH(NH_2)CO_2H$.

Alternatively, the compounds of formula (I) may be prepared by the reaction of a β-(leaving group) alaninyl derivative of formula (V) with a nitroimidazole of formula (IV) wherein $R^1$, $R^2$ and $R^3$ are as defined above except that when $R^2$ is a hydroxyl group, $R^3$ may not be a hydrogen atom and Y is a leaving group, such as a halogen atom, a p-toluenesulphonyl group or a sulfate group.

the process at a slightly raised temperature, for example at about 50°C.

A third method for preparing the compounds of formula (I) comprises the removal of an amino or a carboxyl blocking group from blocked compounds of formula (I) by methods well-known to peptide chemists, and may be used, for example, in conjunction with the first described method by removal of the blocking group after the condensation stage. Amino acid or peptide carboxylic acid groups are generally blocked by esterification and unblocked by base or acid catalysed hydrolysis. The amino group may be protected or blocked by a number of substituents including the carbobenzoxy group (which may be removed by catalytic hydrogenation), the p-toluenesulphonyl group (removable by sodium in liquid ammonia), the formyl group (which may be removed by dilute acid in alcohol), the triphenylmethyl group (removable by mild acid hydrolysis), the phthaloyl group (removable by reaction with hydrazine), the vinyloxycarbonyl group (removable by mild acid hydrolysis or by reaction with bromine and methanol), the trifluoracetyl group (removable by mild alkaline hydrolysis) and the t-butyloxycarbonyl group (which may be removed by mild acid hydrolysis), hereinafter referred to as the t-Boc group.

For example those compounds of formula (I) wherein $R^1$ is a hydrogen atom or a methyl group, $R^2$ is a hydroxyl group, $R^3$ is a hydrogen atom and $a=1$ or 2 may conveniently be prepared by hydroloysis of the corresponding compound wherein $R^3$ is a t-Boc group, under mild acid conditions, for example using trifluoroacetic acid or hydrochloric acid in a suitable solvent such as dimethoxyethane, and optionally recovering the product as the acid addition salt.

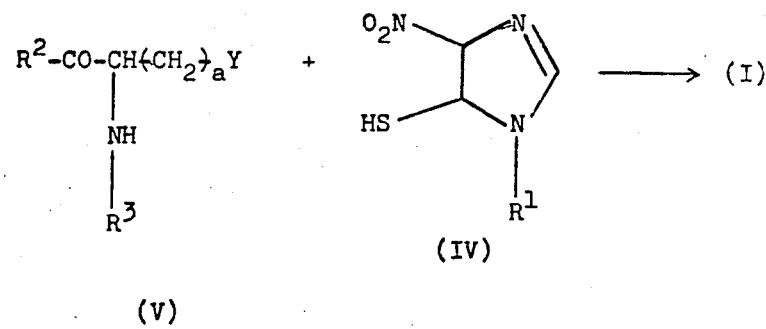

(V)     (IV)

For example the compound wherein $R^2$ is the group $-NHCH_2CO_2H$ and $R^3$ is a carbobenzoxy group may advantageously be prepared by this method. The reaction is preferably conducted in a polar solvent capable of dissolving both of the reactants and may be, for example, dimethylformamide. Although room temperature can be used it may be advantageous to carry out A fourth method of synthesis comprises blocking unblocked or partially unblocked compounds of formula (I), wherein $R^2$ is a hydroxy group and/or $R^3$ is a hydrogen atom, with a blocking group or a blocked amino acid which covalently combines with carboxyl or amino functions. The blocking reagent may be a well-known amino acid blocking reagent such as carbobenzoxyl chloride or it may be an amino acid derivative which has one function blocked and the other function activated. For example the compound of formula (I) wherein $R^2$ is a hydroxyl group and $R^3$ is a hydrogen atom may be converted into the corresponding compound wherein $R^3$ is a carbobenzoxy group by reaction with glycine having the amino function blocked by the carbobenzoxy group and the carboxylic acid function activated by conversion to the azide. Similarly the same compound can be reacted with L-alanine having the amino group blocked by the t-Boc group and the acid group converted to the succinimide ester to produce a compound wherein $R^2$ is a hydroxy group and $R^3$ is the group $CH_3CH(NH_2)CO—$. Preferably such a reaction is conducted at room temperature in a polar solvent, such as dimethoxyethane or isopropanol, in the presence of a reagent which can combine with the acidic bi-products formed, such as triethylamine.

The following Examples illustrate the invention but are in no way intended to limit the scope of the invention.

EXAMPLE 1

1-Methyl-4-nitro-5-(N-t-Boc-S-cysteinyl)imidazole ($R^1$=Me; $R^2$=OH; $R^3$=Me$_3$COCO; $a$=1)

N-t-Butyloxycarbonyl-L-cysteine (N-t-Boc-L-cysteine) (880 mg), prepared by debenzylation of N-t-Boc-S-benzyl-L-cysteine with sodium/liquid ammonia, was dissolved in dimethylsulphoxide (10ml). 1-Methyl-4-nitro-5-chloroimidazole (650 mg) and sodium acetate (1 g) were added to the solution, and the mixture was stirred overnight. The reaction mixture was then diluted with cold 1N hydrochloric acid and extracted twice with ethyl acetate. The combined extracts were washed (4x) with water and dried over anhydrous magensium sulphate. The solvent was removed in vacuo, leaving 1-methyl-4-nitro-5-(N-t-Boc-S-cysteinyl) imidazole as a white solid; yield 996 mg (73%); m.p. 127°–130°C (dec). UV at pH7,$\lambda$max=320nm, $\epsilon$=4620.

EXAMPLE 2

1-Methyl-4-nitro-5-(S-cysteinyl)imidazole ($R^1$=Me; $R^2$=OH; $R^3$=H; $a$=1)

1-Methyl-4-nitro-5-(N-t-Boc-S-cysteinyl)imidazole (50 mg) was dissolved in trifluroacetic acid (0.5 ml), giving a yellowish solution. After 10 minutes at room temperature, ether (20 ml) was added. The resulting white precipitate was washed well with ether and recrystallized from methanol-ether. UV at pH1, $\lambda$max=320 nm.

EXAMPLE 3

1-Methyl-4-nitro-5-(S-glutathionyl)imidazole ($R^1$=Me; $R^2$=NHCH$_2$CO$_2$H, $R^3$=CO(CH$_2$)$_2$CH(NH$_2$)CO$_2$H; $a$=1)

Reduced glutathione (604 mg), 1-methyl-4-nitro-5-chloroimidazole (320 mg), and sodium acetate (500 mg) were dissolved in dimethysulphoxide (10 ml). The reaction mixture was stirred overnight at room temperature giving a bright yellow solution. Addition of ether gave an oil which when triturated resulted in the separation of a yellow green powder which was purified by chromatography on paper with propanol-water. The purified material was crystallized by trituration with ethanol to give a hygroscopic, yellow powder, m.p. 147°–151°C. (dec). UV at pH 1 and 11; $\lambda$max=330 nm.

EXAMPLE 4

1-Methyl-4-nitro-5-(N-acetyl-S-cysteinyl)imidazole ($R^1$=Me; $R^2$=OH; $R^3$=MeCO; $a$=1)

N-Acetyl-L-cysteine (2.0 g) and 1-methyl-4-nitro-5-chloroimidazole (2.0 g) were partially dissolved in water (10 ml). Potassium carbonate (5.0 g) was added producing carbon dioxide, heat and a yellow solution. The solution was allowed to stand at room temperature for two days, neutralized with DOW–50–H+ ion exchange resin, and then passed through a column containing DOW–50–H+ to remove potassium ions. The solvent was removed by lyophilization, giving a yellow powder. Recrystallization from methanol-ether gave 1-methyl-4-nitro-5-(N-acetyl-S-cysteinyl)imidazole; yield 2.9 g (84%), m.p. 156°–160°C. (dec). UV at pH 1: $\lambda$max=335 nm, $\epsilon$=3960; at pH 11: $\lambda$max =335 nm, $\epsilon$=3860.

EXAMPLE 5

4-Nitro-5-(S-cysteinyl)imidazole hydrochloride ($R^1$H; $R^2$=OH; $R^3$=H; $a$=1)

a. N-t-Butyloxycarbonyl-L cysteine was reacted with 4-nitro-5-bromoimidazole in a manner similar to that described in Example 1 to provide 4-nitro-5-(N-t-Boc-S-cysteinyl)imidiazole ($R^3$=Me$_3$COCO).

b. This product was deblocked with hydrochloric acid in dimethoxyethane following the procedure of Example 2 to provide the title compound; yield 80%. UV at pH 1: $\lambda$max=362 nm; at pH 11: $\lambda$max=400 nm.

EXAMPLE 6

1-Benzyl-4-nitro-5-(N-acetyl-S-cysteinyl)imidazole ($R^1$=Bz; $R^2$=OH; $R^3$=MeCO; $a$=1)

A suspension of N-acetyl-L-cysteine (490 mg), 1-benzyl-4-nitro-5-bromimidazole (846 mg) and potassium carbonate (1243 mg) in water (5 ml) was stirred overnight at room temperature producing a red solution, which was chromatographed on a DOW–50H+ ion exchange column to remove potassium ion. Upon removal of most of the water under vacuum the product crystallised as an off-white solid; yield 550 mg; m.p. 168°C (dec.) UV pH 1: $\lambda$max=306–320 nm.

EXAMPLE 7

1-Methyl-4-nitro-5 -(S-homocysteinyl)imidazole)

($R^1$=Me; $R^2$=OH; $R^3$=H; $a$=2)

a. N-t-Boc-L-methionine (2.0g) was dissolved in liquid ammonia (100 ml), and sodium (800 mg) was added in small portions until a blue color persisted for 30 minutes. The color was discharged with ammonium chloride, and the ammonia evaporated under nitrogen. The resulting white powder was dissolved in oxygen-free water and potassium carbonate (3.5 g) and 1-methyl-4-nitro-5-chloroimidazole (1.29 g) added. After stirring overnight the solution was adjusted to pH 7 with dilute hydrochloric acid and extracted repeatedly with ethyl acetate to remove unreacted imidazole. The aqueous solution was then adjusted to pH 2, and the resulting precipitate of 1-methyl-4-nitro-5-(N-t-Boc-S-homocysteinyl)imidazole ($R^3$=Me$_3$COCO) collected.

b. This product was warmed to reflux in water-isopropanol (7:1) whereby the N-protecting group was cleaved, producing the title compound. This could be isolated, yield 500 mg, by filtering unreacted material, evaporating to dryness and recrystallizing from isopropanol-water; m.p. 169°C (dec); UV at pH 1 and 11: λmax 310–330 nm.

EXAMPLE 8

1-Methyl-4-nitro-5-(O-methyl-S-cysteinyl)imidazole hydrochloride ($R^1$=Me; $R^2$=OMe; $R^3$=H; $a$=1)

A solution of 1-methyl-4-nitro-5-(N-t-Boc-S-cysteinyl) imidazole (400 mg) in diethylether was treated with diazomethane until a yellow color persisted. The color was discharged with acetic acid and the solvent was removed in vacuo. The resulting yellow oil was dissolved in dimethoxyethane (5 ml) and treated with saturated hydrochloric acid in dimethoxyethan (3 ml), producing a slightly yellow precipitate. After 30 minutes the suspension was diluted with ether and the precipitate collected and recrystallized from dimethoxyethane-ether to give the title compound; yield 300 mg; m.p. 135°C (dec.); UV at pH 1: λmax = 320 nm.

EXAMPLE 9

1-Methyl-4-nitro-5-(N-glycyl-S-cysteinyl)imidazole hydrochloride ($R^1$=Me; $R^2$=OH; $R^3$=COCH$_2$NH$_2$; $a$=1)

a. N-t-Boc-glycyl-S-benzyl-L cysteine, prepared by coupling N-t-Boc-glycine succinimide ester with S-benzyl-L-cystein, was debenzylated with sodium in liquid ammonia and cooled to 1-methyl-4-nitro-5-chloroimidazole in the manner outlined in Example 1 to give 45% yield of product.

b. The uncharacterized oil was dissolved in dimethoxyethane saturated with hydrochloric acid, which removed the t-Boc protecting group in 10 minutes. Addition of diethylether precipitated the title compound, which was purified by recrystallization from isopropanol-water; yield 57%; m.p. 154°–157°C (dec.) UV at pH 1: λmax = 325 nm; at pH 11: λmax = 335 nm.

EXAMPLE 10

1-Methyl-4-nitro-5-(L-alanyl-S-cysteinyl)imidazole hydrochloride.

($R^1$=Me; $R^2$=OH; $R^3$=COCH(NH$_2$)Me; $a$=1)

a. N-t-Boc-L-alanine succinimide ester (100 mg), 1-methyl-4-nitro-5-(S-cysteinyl)imidazole hydrochloride monhydrate (105 mg), and triethylamine (0.1 ml) were dissolved at room temperature in dimethoxyethane-isopropanol, 1:1 (4 ml). After 90 minutes the reaction mixture was treated with cold dilute hydrochloric acid and extracted six times with chloroform. The chloroform extracts were washed with water, dried over magnesium sulphate, filtered and evaporated to a yellow oil that crystallized from ether-hexane; yield 72%.

b. The crude compound was deblocked as in Example 9 with hydrochloric acid; yield 96%, and recrystallized from isopropanol-ethylacetate, m.p. 152°C (dec.)

UV at pH 1: λmax = 330 nm.

EXAMPLE 11

1-Methyl-4-nitro-5-(N-carbobenzoxy-S-cysteinyl)imidazole.

($R^1$=Me; $R^2$=OH $R^3$=COOCH$_2$Ph; $a$=1)

a. Dicarbobenzoxy cystine (5.0 g) and zinc dust (2.56 g) were stirred at 65°C in methanol (35 ml) and 2N sulphuric acid (25 ml). After 80 minutes the solution was filtered and evaporated to one-fourth of its previous volume, then extracted three times with ether. The combined ethereal extracts were washed with water and evaporated to an oil, to which was added a suspension of 1-methyl-4-nitro-5-chloroimidazole in water (10 ml) containing potassium carbonate (8 g). After stirring overnight the solution was extracted twice with ethyl acetate to remove unreacted chloroimidazole. The aqueous phase was diluted with 2N hydrochloric acid producing a yellow gum.

b. This gum was dissolved in ethyl acetate, dried and evaporated to a foam, which upon trituration with ether yielded a light yellow powder. Recrystallization from tetrahydrofuranhexane gave the title compound; yield 70% m.p. 118°–122°C (dec.) UV at pH 1: λmax = 325 nm.

Treatment of this compound with hydrobromic acid in acetic acid removed the carbobenzoxy group, providing the hydrobromide salt of the compound prepared in Example 2.

EXAMPLE 12

1-Methyl-4-nitro-5-(N-carbobenzoxy-S-cysteinylglycine)imidazole ethyl ester.

($R^1$=Me; $R^2$=NHCH$_2$CO$_2$H; $R^3$=COOCH$_2$Ph; $a$=1)

N-Carbobenzyoy-O-tosyl-L-serylglycine ethyl ester (Biochem (1965) 4, 1818) (700 mg) was added to a solution of the sodium salt of 1-methyl-4-nitro-5-thiomidazole (350 mg) in dimethylformamide (20 ml) at 50°C. After stirring for 24 hours the reaction was evaporated in vacuo at 50°C to 5 ml and poured into cold water. The resulting yellow precipitate was collected and washed with water, then dissolved in chloroform and chromatographed on silica gel, eluting with chloroform-methanol, 20:1. The product was precipitated from chloroform with hexane: yield 300 mg (44%); m.p. 176°–177°C; UV at pH 1: λmax = 335 nm.

EXAMPLE 13

1-Methyl-4-nitro-5-(L-phenylalanyl-S-cysteinyl)imidazole hydrochloride ($R^1$=Me; $R^2$=OH; $R^3$=COCH(NH$_2$)CH$_2$Ph; $a$=1)

The title compound was prepared in the same manner as that described in Example 10; yield 43%; m.p. 135°–140°C (dec.). UV at pH 1 and pH 11: λmax = 335 nm.

We claim:

1. A compound of Formula I or a pharmaceutically acceptable salt thereof

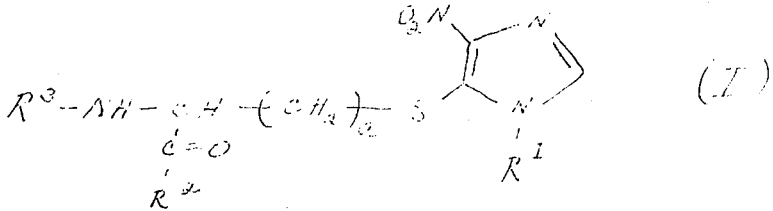

wherein $R^1$ is a hydrogen atom, lower alkyl, or benzyl, $R^2$ is $OR^5$, $NR^5$ or an amide linked amino acid residue of the formula $-NH-(CH_2)_m-COOH$, wherein $m$ is 1 or 2, $R^5$ is a hydrogen atom or lower alkyl, $R^3$ is a hydrogen atom,

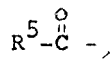

an amido linked amino acid residue of the formula

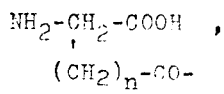

wherein $n$ is 1 or 2, or

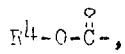

in which $R^4$ is t-butyl, benzyl or $CH_2=CH-$, and $a$ is 1 or 2.

2. The compound according to claim 1 which is 1-methyl-4-nitro-5-(N-t-Boc-S-cysteinyl) imidazole or a pharmaceutically acceptable salt thereof.

3. The compound according to claim 1 which is 1-methyl-4-nitro-5-(S-cysteinyl) imidazole or a pharmaceutically acceptable salt thereof.

4. The compound according to claim 1 which is 1-methyl-4-nitro-5-(S-glutathionyl)imidazole or a pharmaceutically acceptable salt thereof.

5. The compound according to claim 1 which is 1-methyl-4-nitro-5-(N-acetyl-S-cysteinyl)imidazole or a pharmaceutically acceptable salt thereof.

6. The compound according to claim 1 which is 1-Benzyl-4-nitro-5-(N-acetyl-S-cysteinyl) imidazole or a pharmaceutically acceptable salt thereof.

7. The compound according to claim 1 which is 4-Nitro-5-(S-cysteinyl) imidazole or a pharmaceutically acceptable salt thereof.

8. The compound according to claim 1 which is 1-methyl-4-nitro-5-(S-homocysteinyl)imidazole or a pharmaceutically acceptable salt thereof.

9. The compound according to claim 1 which is 1-Methyl-4-nitro-5-(O-methyl-S-cysteinyl) imidazole or a pharmaceutically acceptable salt thereof.

10. The compound according to claim 1 which is 1-Methyl-4-nitro-5-(N-glycyl-S-cysteinyl)imidazole or a pharmaceutically acceptable salt thereof.

11. The compound which is 1-methyl-4-nitro-5-(N-glycyl-S-cysteinyl) imidazole or a pharmaceutically acceptable salt thereof.

12. The compound according to claim 1 which is 1-Methyl-4-nitro-5-(N-carbobenzoxy-S-cysteinyl)imidazole or a pharmaceutically acceptable salt thereof.

13. The compound according to claim 1 which is 1-Methyl-4-nitro-5-(N-carbobenzoxy-S-cysteinylglycine) imidazole ethyl ester or a pharmaceutically acceptable salt thereof.

14. The compound which is 1-methyl-4-nitro-5-(L-phenylalanyl-S-cysteinyl) imidazole or a pharmaceutically acceptable salt thereof.

15. The compound of claim 1 in which the amino acid residue is $-NH(-CH_2)_m CO_2H$ wherein $m=1$ or 2, and in which the amino acid residue of $R^3$ is

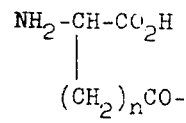

where $n = 1$ or 2.

16. The compound of claim 1 in which $R^1$ is methyl.

17. The compound according to claim 1 in which $R^2$ is $OR^5$ where $R^5$ is a hydrogen atom or lower alkyl.

18. The compound according to claim 17 in which $R^3$ is a hydrogen atom or

where $R^5$ is a hydrogen atom or lower alkyl.

19. The compound according to claim 18 where $R^5$ is lower alkyl.

20. The compound according to claim 18 in which $a=1$.

21. The compound according to claim 19 in which $a=1$.

* * * * *